United States Patent [19]

Strickland

[11] Patent Number: 5,497,568
[45] Date of Patent: Mar. 12, 1996

[54] INTEGRATED GROUP OF EXCAVATOR CONTROL ASSEMBLIES

[76] Inventor: William A. Strickland, 1512 North Pebble Beach Blvd., Sun City Center, Fla. 33573

[21] Appl. No.: 928,115

[22] Filed: Aug. 11, 1992

Related U.S. Application Data

[63] Continuation-in-part of Ser. No. 664,981, Mar. 6, 1991, abandoned.

[51] Int. Cl.⁶ .................................. E02F 5/02; B25J 3/04
[52] U.S. Cl. ...................................... 37/348; 414/5
[58] Field of Search ............................ 37/348, 379, 347, 37/906, 907; 414/699, 695.5, 695.6, 695.7, 909, 5, 7, 2

[56] References Cited

U.S. PATENT DOCUMENTS

| | | | |
|---|---|---|---|
| 2,057,086 | 10/1936 | De Millar | 37/906 X |
| 2,131,291 | 9/1938 | Maust | 37/906 X |
| 2,142,135 | 1/1939 | Lawton | 37/906 X |
| 3,608,743 | 9/1971 | Mosher | 414/5 |
| 3,618,786 | 11/1971 | Frck | 414/5 |
| 3,698,580 | 10/1972 | Carlson et al. | 414/5 |
| 4,288,196 | 9/1981 | Sutton, II | 37/348 X |
| 4,776,750 | 10/1988 | Griswold, Jr. et al. | 37/348 X |
| 5,018,922 | 5/1991 | Yoshinada et al. | 414/5 |
| 5,103,404 | 4/1992 | McIntosh | 414/5 |

FOREIGN PATENT DOCUMENTS

| | | | |
|---|---|---|---|
| 580278 | 11/1977 | U.S.S.R. | 37/906 |

*Primary Examiner*—Randolph A. Reese
*Assistant Examiner*—Spencer Warnick

[57] ABSTRACT

A system for controlling a track propelled excavator that has an allowable 360 degree swing arc including: (a), a positioning controller for all five (propel, swing, boom, arm, and bucket) motions: (b), positioning of small members that represent the large deck, boom, arm, and bracket by a flow of fluid in series with each large member's actuator—eliminating a need for transmitting each digging member's angular position back to the controller; (c), a handle with tooth type edge that represents the large bucket, for scraping along templates for guiding desired earth contours; (d), guide plates and positioning switches for acheiving accurate and safe placement of the bucket during swing and digging motions; (e), a mobile armrest that allows ease of operator's small scale motions when guiding large scale digging: (f), and, an assembly for pulling the small bucket/handle through a series of desired small scale positions to achieve automatic trench digging.

18 Claims, 6 Drawing Sheets

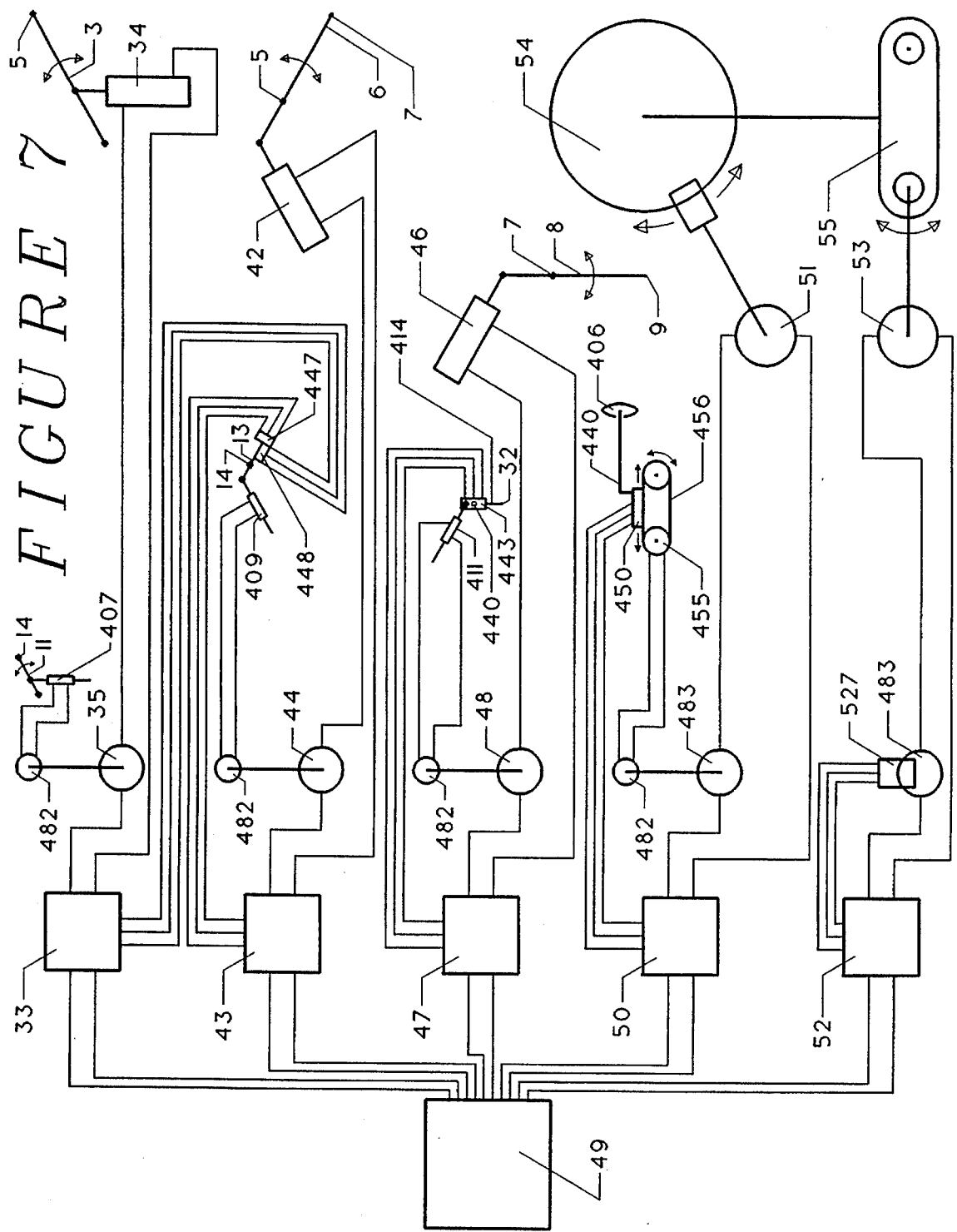

INTEGRATED GROUP OF EXCAVATOR CONTROL ASSEMBLIES

CROSS REFERENCE TO RELATED APPLICATIONS

This application is a continuation in part of Ser. No. 07/664/981 filed on Mar. 6, 1991, now abandoned.

OTHERS' RIGHTS TO THE INVENTION

None

BACKGROUND OF THE INVENTION

1. Field Of The Invention

This invention is in a category of a bucket positioning control system for an excavator. This invention's control system arrangement relates primarily to hydraulically actuated excavators having an allowable swing rotation of 360-plus degrees.

2. Background Art

| | Referenced Patents | |
|---|---|---|
| | U.S. Pat. No. | Date |
| (1) | 3,880,304 | 4/29/75 |
| (2) | 4,059,196 | 11/22/77 |
| (3) | 4,394,102 | 7/10/83 |
| (4) | Japanese Pat. No. 59-185233 | 10/20/84 |

BACKGROUND OF THE INVENTION

All referenced patents have small scale controller representations of each of the present day excavator's large digging members. Those large digging members include; (1) a large boom, which gives pivotal support to, (2) a large arm, which gives pivotal support to, (3) a large bucket. The large boom, arm, and bucket can each be individually driven by one or more hydraulic cylinders through an allowable arc of approximately 120 degrees in the same vertical plane.

The large boom is pivotally supported on a base. That base, on a small sized wheel propelled excavator, is at the rear end of its lower frame and allows an approximate 45 degree horizontal rotation (called swing) from a centered position.

On larger excavators the base support of the boom is an upper frame with deck (called a deck) that in turn has an allowable 360-plus degree horizontal rotation (swing) on its supporting lower, track propelling, frame.

The stated 360-plus degree horizontal rotation capability may be desirable to save time when digging while facing one direction and dumping the load 180 degrees away, while proceeding nonstop "on the fly", duping the rotational swing. A new digging position might be somewhat more than a 360 degrees swing rotation from the last position. The operator may then alternately rotate in the opposite direction to keep from getting dizzy.

All referenced patents (and this invention) have proposed small (sometimes called master) boom and arm members that have a proportionate length and sequence of pivotal mountings equivalent to the large (sometimes called slave) members. At the outside end of the referenced patents' small arm is a controller's knob or lever type handle which is used to guide the large bucket's angular positions (in the direction of an inward curl or outward dump), as well as the positions of the axis between the small arm and the knob or lever type handle. That knob or lever however has not been identified as representing the length with teeth, or the bottom shape, of the large slave bucket.

For all referenced patents' bucket positioning controllers, except U.S. Pat. No. 3,880,304's controller, each small boom, arm, and bucket-lever-handle member is initially set at the same angle as its large equivalent boom, arm, and bucket. Thereafter, the slight leading angular position of each of those small members with relation to each of their large members is used to cause the large members to follow the small members synchronously in large scale. Thus, instead of today's abitrary actuation of two or more joy stick type levers required to move the bucket for digging, only one bucket mimic positioning lever is required.

Controller signals of desired direction and speed for each boom, arm, and bucket motion for all referenced patents but 3,880,304 are proportional to the amount of small angular displacement that each small member leads each large member's represented position as transmitted back to the controller. For referenced U.S. Pat. No. 3,880,304, it is the slight angular leading positions of the knob handle guided small pattern members, with relationship to positions of the small scale representations of the large members, that provide the source of direction and speed signals. U.S. Pat. No. 3,880,304 has a positive feedback mechanical linkage that causes each separate small scale boom, arm, bucket and swinging support to follow the exact angular position of each separate large boom, arm, bucket and swinging support respectively. The pattern members are used to actuate the signal devices that are mounted on the small (mimic) members and thus guide the large and small members.

The commercially available large main valves and signal devices as outlined in U.S. Pat. No. 3,880,304's columns 3 and column 4 (except 4's last paragraph) are similar, except for lever or shaft input arrangements, to those proposed in this invention.

Each U.S. Pat. No. 3,880,304's direction and speed guiding unit is called a "signal device" and each is listed to be of a hydraulic, pneumatic, or electric design (column 4, lines 44 through 58) to accomodate a same category of design at the input (amplifier) ends of the large (main) valves. Signal devices with mating input ended large valves are of the same types and have the same characteristics as proposed for this invention.

The lengthy hydraulic, electric or pneumatic connecting lines between each signal device and its associated large valve have generally not been shown in U.S. Pat. No. 3,880,304 ostensibly to avoid drawing clutter. Those connecting lines, as with this invention, can consist of one high pressure hydraulic or pneumatic (with a pressure relief valve) or positive voltage input line to the signal device. Two separate (forward and reverse) exit lines from the signal device transmit the desired direction and speed to the associated large valve. The large valves regulate the fluid flow to the large digging and swinging members' actuators.

The dominant number of signal devices preferred and used on present day large excavators are hydraulic pilot valves, that operate at approximately 600 pounds pressure. That pilot pressure may be one-sixth of the released fluid pressure that drives the large working actuators.

All present two-joystick type of controls, and all referenced patents' proposed bucket positioning controls (including this invention's) have pilot signals of desired bucket direction and speed input to separate, valves for each motion. Each separate large valve controls the flow of high pressured fluid from the pumping source directly to each separate actuator for the large bucket, arm, boom, swinging deck, and lower track propelling frame.

With one or more referenced patents, an angular step-by-step horizontal rotation of the base of the small master digging members is proposed to guide the large members in a swinging (rotational) motion. But a small member swing rotation of more than approximately 45 degrees would put the handle and small members at an impractical position for sequential spoil pile scooping then swinging back 100 degrees for dumping and scraping for trench refilling. Therefore any step-by-step horizontal-rotating-handle method of guiding a wide arc swinging motion, for an excavator with a 360-plus degree allowable rotation of the large deck, appears to be impractical, Note that present day small wheel propelled excavators may use one separate large, reversible, manually operated, valve to control the feed of hydraulic fluid directly to each separate boom, arm, bucket and swing motion actuator. However all proposed positioning controllers including those described in the referenced patents and this invention, for large excavators with a 360-plus rotational capability, utilize large main valves with inputs from small pilot valve type signal devices. Again, as presently used, and as proposed for this invention, large main valve inputs and pilot valve outputs would be of the same hydraulic, pneumatic or electric types.

The most popular commercial small, short stroke, low force actuated, reversing, pilot valve type of signal devices used on today's large excavators include compression springs for forced lever and shaft return to a neutral "off" position. Those springs are located on the outside of each individual forward and reversing small valve enclosure within the pilot valve signal device enclosure. Only one internal valve and spring can be actuated at a time.

That type of excavator's commercial signal device, generally has a solid or hollow shaft that mounts a rocker arm and a projecting lever that is fixed to, and can slightly rotate, or be rotated by the shaft, between physical stops, as an input, Or the shaft itself can be rotated as an input. Two separate (forward and reverse) valves sometimes have their core projecting stems facing, in line, and can be alternately (one at a time) actuated by one interposing rocker arm. Or, the stems can be separated and in parallel so that each stem can be driven down by one of two rocker arm projections—on opposite sides of the shaft. A similar constructed type of signal device has been listed and proposed by referenced U.S. Pat. No. 3,880,304 and is again proposed in this invention as the type of signal device to initiate desired bucket direction and speed.

To help understand the principle that allows workability of referenced U.S. Pat. No. 3,880,304 and this invention's first control system arrangement, consider a reversing stepless pilot valve made up of two in-line opposing 12 volt type triggers as used in portable hand powered tools, with a pivoting lever between the two triggers mounted on the side of a large boom. This pilot valve reversible, variable electrical output would be input to a solenoid input, reversible, proportional output, large main valve that has a high pressured fluid input, from a prime mover driven hydraulic pumping source. That high pressured fluid would be controlled by the large valve and piped to a double acting hydraulic cylinder actuator. That cylinder would power the large boom, which would be pivoted on its left hand end and have its right end driven up or down.

The described pilot valve signal device would have its "up" and "down" electrical valves actuating lever's outside end, when in neutral, pointing along the length of the boom. As long as the lever's movable end would be hand forced (against an internal "up" trigger compression spring) in an upward direction, the "up" valve within the pilot signal device would pass its output current to the large main boob valve solenoid, The solenoid controlled large valve would in turn pass fluid from the high pressured hydraulic pumping source to the large boom actuator, causing the large boom to continue rising (within physical limits), As soon as the hand travel and force would stop, the boom with its mounted signal device enclosure would catch up, at an end slowing rate, because of the slight angular decreasing lead position of the lever's end.

A small boom driven to be parallel to the large boom could instead have the signal device mounted in a similar manner on its same side. Then as long as the small scale boom's non pivoting-end lever would be forced to traverse through a small length arc, the non-pivoting-end of the large boom would traverse the same number of degrees in a large length arc.

The method of guiding the large boom movement is also presented here as an example to illustrate a similar motivation of the large arm, bucket and swinging deck.

A 1991 race between (a) the standard two-joystick type of control versus (b) the U.S. Pat. No. 3,880,304 type of mimic positioning control, were both applied to a one third scale backhoe simulator. That recorded race proved that with the mimic positioning control an operator could perform a given series of maneuvers in one-half the time that the same operator took when using the standard control. The above described 12-volt variable output "trigger" mechanisms were used as the "pilot valves" for both the standard and mimic positioning controls.

By limiting the signaling angle deviation from a small scale member's position, both U.S. Pat. No. 3,880,304 and this invention avoid the later noted referenced patents' possibility of producing incorrect signaling directions.

3. Problems Or Limitations With Prior Art

No. 1—Referenced Patents' Problem—Exposed Transmission Lines or Linkage.

All referenced patents (1) through (4) require that representations of each main digging member's angular position with respect to its supporting member, be sensed on-site, and transmitted back to the controller assembly. The required angular position transmission lines are located along the main arm, boom, and deck members, and thus are exposed to abuse from sharp, abrasive rocks—particularly when digging a deep trench. The areas of most severe exposure occur at the flexible loops at the pivot points between members.

Abuse and rupture of a hydraulic line to a bucket actuator, could disable the operation of the bucket. However, disabling a line or linkage that transmits the bucket's angular position could cause a dangerous misdirected bucket movement.

No. 2—Referenced Patents' Problem—The Potentially Harmful Effect Of Common Bucket Stall On A Desired Bucket Digging Direction.

Referenced patents numbered (2) through (4) use the operator guided temporary lead position of each small boom, arm, and bucket digging member with respect to its equivalent large member to provide signals to motivate each large member to seek a position parallel to its equivalent small digging member. The referenced patents that use this "closed differential" approach could have the small master members forced by the operator too far out of angular step with their equivalent large members during a common bucket stall, or slowed-down, condition. Such a stall condition could occur if the operator takes too deep a bite, or if the bucket strikes unyielding rock.

It is important that each small, and equivalent (same named) large members remain in near parallel positions for the following exampled reason. Assume that the bucket pointed to a (side view) 4 o'clock position when the bucket stalled temporarily against too big a load. The bucket/handle, if not similarly restricted might, during bucket stall, be forcibly "curled" by the operator to a 7 o'clock position. Then when the large bucket broke through stall, a continued upward curling handle signal might result in a downward curling bucket. Similar signal misrepresentations could occur with the arm motion.

Referenced U.S. Pat. No. (3), 4,394,102 seems to note a possible equivalent small and large member angular deviation problem, during a bucket stall condition, in their specification column 3, last sentence, That patent (3), FIG.4, and its specification column 3, lines 33 through 51, calls for the bucket movement to drive cylinder piston 52's movement to the left, hence feedback piston 56 to the left, filling pilot inlet 40, and draining pilot inlet 34, to cancel the leftward moving piston 32—all to cancel curling of the master bucket 12. But, if the digging bucket is stalled against unyielding material, as is common in rocky soil, continued curling effort by the operator, it becomes apparent, could cause the master item 12 to come many degrees out of parallel with the digging bucket—at which time, the desirable bucket positioning control could be lost. As noted above, if sufficient deviation occurs, incorrect arm, and bucket, positioning signaling could also occur.

With reference to U.S. Pat. No. 4,059,196's FIG. 11 and its associated specification column 13 starting with line 62 and the next 11 lines, it states "At this point in time, when the boom 4 of the power shovel 1 cannot follow the rapid movement of the control boom 104 of the control lever 100, or when the boom 4 cannot easily move with the movement of control boom 104 due to heavy external load applied thereto, the value of the differential voltage generated between the potentiometers 207, and 217 will be greater than a given value. This differential voltage is taken out to actuate the electromagnetic brake 130 coupled to the pivot 107 of the control boom 104 through the torsional elastic coupling 132."

In U.S. Pat. No. 4,059,196, attempts to overcome the deviation concern are shown by the FIG. 11 friction restricting addition of items 130, and 132. Patent (4) written in Japanese, apparently takes a similar approach to Patent (2).
No. 3—Referenced Patents' Problem—Lack Of A Swing Positioning Control For Track Propelled Type Excavators.

U.S. Pat. No. 4,059,196's controller is, as pictured in the drawing, for a track propelled excavator having an allowable 360-plus degree swing arc. That controller, as well as all present day standard two-joystick controllers, does not include swing positioning control. So, if an operator, due to some physical problem, should slump forward, unconscious, with his hand resting at some side angle against its "on—off" swing control, the excavator would continue an uncontrolled, potentially dangerous, multi-circling swing motion. This concern would not be overcome despite U.S. Pat. No. 4,059,196's unusual addition of pressure switches under the operator's seat and right elbow.

But, with some other referenced patents, by including positioning control with the swing motion too, during a possible operator's similar physical problem, the excavator and guiding handle would move laterally in one direction only until the handle moved clear from the side force exerted by the limp hand.

The obvious positive effect of including positioning control with the swing motion as well as the boom, arm, and bucket motions is that coordinating four motions is more simply and efficiently done with one hand—as with eating.
No. 4 Referenced Patents' Problem—Disadvantageous Effects Of Handle-Horizontal-Swinging-Type Swing Positioning Control On The Required Angle Of The Operator's Dig Guiding Motions.

Referenced U.S. Pat. Nos. (1) 3,880,304, and (3) 4,394,102 apply only to wheel propelled (tractor type) excavators having a limited swing arc of approximately 45 degrees from a neutral position. Hence any harmful effect of swing angle, on desired operator digging motions, involves limited discomfort.

U.S. Pat. No. (1) 3,880,304's claim 1 sub B refers to mimicking the exact angular position of all main members, including the swinging base, by small scale equivalent mimic members—therefore patent (1) can only apply to the small wheel propelled, short swinging arc excavators as pictured in that patent.

Patents (2) and (4) however apply to track propelled excavators, that have an allowable 360-plus degree swing arc. But only patent (4) proposes both a 360-plus degree swing capability and swing positioning control.

Repeating, patents (1), (3), and (4) include a horizontally rotatable, handle leading, swing positioning control, but patent (4) alone appears to have an insurmountable problem. With all three, their entire controller master "assembly" faces straight forward from the operator's seat position only initially when the small and large digging assemblies are parallel to the propelling wheels or tracks. During a swing motion, however, the small digging assembly or controller is proposed to swing in step, with the main digging members, at an increasing angle to the seat facing. If referenced patent 4's arrangement is required to rotate the large digging members through a 150 degree angle while alternating spoil pile scooping and trench refilling operations, an operator would have to have his operating arm, and/or elbow unacceptably bent sharply while carrying out one of those two operations.

The referenced patents, associated with smaller swing arcs, that include swing positioning control as noted, can have a similar problem during trench refilling or digging, though to a lesser degree. But, when the required large member's digging or dumping motion is transferred from a near extreme left-hand to right-hand position (using positioning control), a disturbing change in the direction of required operator's movements, while at one of those extreme positions, appears to be involved with all referenced patents' swing positioning controllers.
NO. 5 Referenced Patents' Problem—Lack Of A Provision For Handle Horizontal Swing Repositioning.

Any referenced controller, on a track propelled excavator with an allowable 360-plus degree swing arc might be required to swing, for example, 150 degrees, pivoting at its vertical support to provide swing positioning control. But, without repositioning means, the operator in that case might be left with required digging motions that are impractical, as mentioned —resulting in non-positioning control for the digging or dumping motion, as well as the swing motion.

An arrangement is needed to allow repositioning of the handles in order to extend any swing arc in either direction while keeping the digging motions faced away from the seat.

A preferred arrangement might allow a single lateral approximate two inch handle movement to represent a deck swing of 360 degrees—with handle(s) laterally preset so as not to have to be repositioned for a planned 360 degree swing arc.

Handle swing repositioning should be available as needed.

No. 6. Referenced Patents' Problem Or Limitation—Lack Of A Template To Guide Digging To Achieve Desired Earth Contours.

Normally a clean-up crew is needed to follow the excavator's work, and use hand tools to place the bottom of a trench at the specified straight lined slope. That manual effort involves considerable cost. Also, when digging a canal, or pool bottom to a specified curved shape for a form for grid steel reinforcement on which to spray concrete, considerable manual earth redistributing effort, after excavating, is required.

A desirable arrangement could include a flat plate template combined with a handle that accurately represents the length with teeth and bottom shape of the bucket, thus allowing three dimensional in-line digging of a narrow canal with sloped sides without requiring a penalizing amount of manual cleanup.

Also, a desirable arrangement should include a properly shaped bucket and template along with swing positioning control so that a swing scraping and sweeping motion could be included with the digging stroke.

No. 7 Referenced Patents' Problem Or Limitation—Lack Of A Rotary Type Actuator For The Swing Moton.

U.S. Pat. No. 4,059,196's FIG.4 shows hydraulic cylinder 137 as the main swing motion actuator. However member 137 is incongruous with the parent's FIG. 1 which shows a track propelled excavator that traditionally has a wide (360-plus degree) allowable swing arc. Hydraulic rotary type actuators are commonly felt necessary where a 360-plus degree arc is desired.

No. 8 Referenced Patents' Problem Or Limitation—Lack Of A Stop-Travel Aid For Any Notion In many instances where dust or harsh light might cause temporary blindness of the operator, it would be helpful to have a simple means of insuring that the bucket reached the proper height, before swinging over a truck, for example, to dump spoil.

It should also be helpful, particularly when the operator is fatigued, to have a means of having the bucket stop accurately over the trench being dug, when returning from dumping.

None of the referenced patents appear to utilize guide plates, or position switches to aid the operator when stopping the swing or other motion.

Bucket position determining switches would be helpful when making settings for programmed control of the bucket throughout its travel.

No. 9 Referenced Patents' Problem Or Limitation—Lack Of Two Space-Separated Handles.

U.S. Pat. No. 4,394,102, FIG. 2, shows two small control knobs, but not two space-separated handles. Two space-separated handles would allow one handle to be in close contact with templates, guide rods, position switches, or a handle guiding digging ramp, while the other handle is unrestricted to be guided in digging motions.

In order to reduce fatigue, and allow one hand, for example, to wipe away sweat from the eyes, or scratch an itch, while the operator continues digging, it would be helpful to have a two handled) controller. One handle to be available for each separate (left and right) hand.

Each handle would be most helpful if it represented the length, including teeth, and the bottom shape, of the digging bucket and thus better accommodate the use of templates and guide plates.

No. 10—Referenced Patents Problem or Limitation—The Absence Of A Counterbalanced, Easily Motivated, Controller Having An Operator's Arm Support.

Upward as well as downward operator hand and arm powered motions are required for handle positioning control of the bucket during digging and swinging. This type of handle positioning control could be very tiring unless an operator's forearm is supported by a fulcrum fixed at a balancing point under the forearm.

No. 11 Referenced Patents' Problem Or Limitation—A Tight Grip Is Continuously Required On A Knob Or Lever Type Handle—Resulting In Hand Cramping, Separately spaced finger positions around the center of handle curling and dumping rotation are needed to allow the operator to have a relaxed hand grip.

No. 12 Referenced Patents' Problem Or Limitation—Lack Of Index Marks And Angular Degree Marks On Both The Small And Large Deck, Boom, Arm, And Bucket Adjacent Members That Require The Same Parallel Initial, And Restored, Settings.

A problem has been noted where the equivalent large and small members were forced to non-parallel positions. So, at any time that parallel positions need to be set, or reset, angular indicating markings would be very helpful on adjacent members.

No. 13 Referenced Patents' Problem Or Limitation—Lack Of An Arrangement That Would Allow The Small Boom To Be Moved Singly, Freely, And Simply, To A Parallel Angular Position Already Set For The Large Boom—With Separate Paralleling Of The Small And Large Arm And Small And Large Bucket Members To Follow.

No. 14 Referenced Patent's Problem Or limitation—A Need For Consistant Boom Signal Outputs Regardless Of The Position Of The Handle Tests performed in March 1991 on a model sized backhoe equipped with a mimic positioning controller prove that it would be helpful to have the maximum boom signal output when the operator exerts a force in line with the the small arm. With that arrangement, regardless of the angle between the small and large boom and arm, a given handle guiding force will produce the same boom actuator response.

OBJECTIVES OF THIS INVENTION

The objectives of this invention are to fill all of the above listed referenced patents' limitations or omissions.

The small digging members already described in the "Background" are sometimes referred to as master or controller members, while the large members are sometimes referred to as main or slave members. It has been common in the industry to refer to a "swing" motion to describe the horizontal rotation of the deck, and to a "signal device" as reversible, short stroke, low force operated, stepless output, spring centered, commercially available pilot valve which signals the desired direction and speed of the member being controlled.

SUMMARY

Present day excavators utilize lever operated pilot valves that require arbitrary movements, to control the three dimensional positioning of the bucket. Therefore efficient operation of a large excavator with a 360-plus degree allowable horizontal rotation requires coordinating skills comparable to playing par golf. Few excavator operators, even after much practice, become proficient. However anyone, even with eyes closed, can skillfully guide a spoon through the three dimensions required to eat a meal because that task is biomechanically natural. This invention's first control system arrangement includes the addition of a practical positioning control for the swing motion as well as to the other boom, arm, and bucket motions that already have had positioning control proposed by prior art for an excavator with 360-plus degrees rotating capability. Thus operation of a large excavator can become fully biomechanically natural, and as simple and easy to learn as the example of manuevering a spoon, with one hand, while eating.

It's helpful to review the earlier "Background" descriptions in this text of the present day hydraulically actuated excavators' standard digging, swinging and propelling hardware, together with the referenced patents' bucket mimic positioning controllers proposed hardware for future excavator applications.

Sub-assemblies that make up the first control system arrangement of this invention are reviewed separately. Then those sub-assemblies are grouped and described as a working excavator control system arrangement.

A number of referenced patents have described how small boom, arm, and bucket/handle members can be moved through desired small scale paths and have the large boom, arm, and bucket respectively follow those paths step-by-step, in large scale. But, to better utilize an accurate mimic positioning digging capability, a template is proposed in a first sub-assembly of this invention which represents, in a small scale, a desired large scale earth contour. That template is fixed in place below the handle's tooth edge with flexible hardware.

This first sub-assembly of this invention includes hardware to modify any referenced patents' controlling knob or lever to be a true small scale handle representation of the large bucket. With that modification this invention's template and mounting provision would aid any prior art bucket mimic positioning control system arrangement, in addition to that proposed by this invention, in achieving a true large scale version of a desired earth surface contour while the bucket curls through an approximate 120 degrees, This invention's second sub-assembly is included only to illustrate the use of the rotary position (including numbers of full revolutions plus any part of a revolution) of the large output shaft of a separate first, boom, arm, and bucket hydraulic motor, Each first motor is connected in fluid series with one port of each large member's large actuator, Therefore each first motor's revolutions do, in effect, measure the in and out volume of fluid passing to and from each assigned motion's large actuator, and thus represent each separate large boom, arm, bucket, swinging deck and lower frame large actuator's position and large member's position. While each of the second sub-assembly's boom, arm, and bucket's first motor's passing fluid continues to position its large member, its large output shaft is connected by a flexible shaft to a screwjack linear actuator. The screwjack is selected so that its extensible length is driven in concert with and parallel to, its large member's actuator. Thus each second assembly's small screwjack drives its small digging member through a same arc as its large member's arc.

There are four separate third sub-assemblies as a portion of a first control system arrangement of this invention—one for each separate boom, arm, bucket and deck motion. Each third sub assembly has its first hydraulic motor's large shaft directly coupled to, and driving a small hydraulic, positive displacement, reversible rotary pump. Each separate small hydraulic rotary pump is piped to and drives a separate small boom, arm, and bucket cylinder actuator, and a small swing motion's belt rotary actuator. Here, the first motor and coupled small pump for each boom, arm, and bucket motion are selected and positioned so that their number of shaft revolutions cause their associated actuators to move a linear distance in a same small scale as a scale of each large to small digging member.

A fourth sub assembly is a portion of the first control system arrangement of this invention and is called a controller. Here a boom and an arm motion signal device are directly mounted on the controller's small arm. A bucket motion's signal device is mounted in effect on a small arm-to-bucket-pivoting axis—here being a control shaft. A deck motion's signal device is mounted on a linear portion of a small cogged belt which is a representation of the large deck. All signal devices are mounted so as to allow their actuation by the control shaft. The control shaft has a handle, which represents the large bucket, fixed at each end.

The swing signal device, as mounted on this controller's width-saving cogged belt type of small deck representation of the large deck, is actuated by a lateral movement of the handle, control shaft and linkage.

This invention's first control system arrangement includes third and fourth sub assemblies and has the output of a selected hydraulic, electric, or pneumatic pilot valve type signal device, for each motion, input to the respective hydraulic, electric, or pneumatic amplifier input end of a stepless output reversible hydraulic, commercially available, large valve. Fluid is forced from a pumping source through each separate motion's large valve after each large valve is initiated by each motion's signal device. Fluid through each large valve is forced in series through each separate motion's hydraulic motor (identified as a first motor) and large actuator.

Within the first control system arrangement of this invention, each small and each equivalent large boom, arm, bucket and deck member can be motivated in one or mope pairs by a small movement of the handle—passed on to any input lever and/or shaft of any of the four, small member mounted, signal devices.

Even duping severe bucket stall conditions each pair of a small and large member of a same name are forced to remain in step and so avoid the "Background" noted possibility of misdirected handle signals.

Also, within the first control system arrangement of this invention, no main member, position indicating, transmission lines or linkages are exposed, subject to abuse, along the main bucket, arm, boom, and deck members.

The unique placement of the boom motion signal device, mounted directly on the small arm of the fourth assembly's controller portion of this invention, allows a consistent output, as initiated by the handle, control shaft and linkage, regardless of the angle between the small arm and small boom. No other referenced patent has this capability.

This invention, as noted above, includes a positioning control arrangement for the swing motion as well as the boom, arm, and bucket motions on an excavator with a 360-plus degree swing arc—by having the handle move laterally to cause a simultaneous horizontal swing rotation of the large deck. In that manner positioning control of the digging and dumping motions of the handle can always be comfortably carried out straight forward from the operator's seat facing which is parallel to the digging plane of the large members.

The actuation of the large bucket's vertically rotational motion is initiated in this invention by the leading angular deviation of the handle and control shaft with respect to the small bucket signal device's housing.

This invention's "handle" consists of two separated handles, each having a length (with tooth edge) and bottom shape that represent the large bucket in small scale. Each handle has separate finger holes, at comfortable radii from the handle's pivoting axis, that allow comfortable use of one handle with a previously described template.

This invention includes one or more guide plates as in the fourth sub-assembly, that are strategically placed to stop a laterally moving handle as desired when the large bucket is over a trench. Also a guide plate may be located and fixed with respect to the handle to allow a swing only at a bucket height necessary to clear a truck body before dumping.

Two spaced-apart handles in this invention's fourth sub-assembly allow one handle to be in contact with the templates and guide plates while the second handle is unrestricted in guiding the first handle's contact with those templates and guide plates.

An optonal fifth sub-assembly of this invention includes a alternate variable input speed arrangement to the small rotary pump that powers the motor that drives a small belt representation of the large swinging deck. With this variable input speed arrangement a desirable lateral handle movement can be obtained that provides a given large deck swinging arc.

This type of fifth sub-assembly can be modified to have a first motor driven rotations counting propel switch. That switch, with a selected count, allows a desirable preset propelling distance to be obtained.

This invention includes with each motion, a bypass valve placed between a pair of hydraulic lines that power each small member's actuator, in the third sub-assembly. Each separate bypass valve can be momentarily opened, while the excavator is deenergized, to allow the handle to move each small boom, arm, and handle to positions in parallel with the large boom, arm, and bucket respectively. Repositioning of the handles to allow a wider swing arc can use this same facility.

This invention includes markings on the large members and the small members that indicate the angular relation between each supporting member and the member that it supports, thus facilitating easy parallel positioning of each large and equivalent (same named) small digging member.

This invention's fourth sub-assembly's controller includes hardware that causes a supporting fulcrum to remain effectively located under the operator's forearm so that handle guided up and down movements are balanced and can be made with ease.

This invention's first control system arrangement, as shown by separate schematic representations of the separately located sub-assemblies and prime mover driven main fluid pumping source, includes interconnecting lines to and from the large boom, arm, bucket, and deck actuators and the hydraulic (or electric, or pneumatic) lines to and from the boom, arm, bucket, and deck signal devices and their respective large valves.

BRIEF DESCRIPTION OF DRAWINGS

FIG. 7 includes the first control system arrangement of this invention and shows the piping connections among the boom, arm, bucket, swinging deck, and propelling components—here laid out as separate motions without a common control shaft input, so connections can be easily traced without crossings.

DETAILED DESCRIPTION OF DRAWINGS

Figure 1:
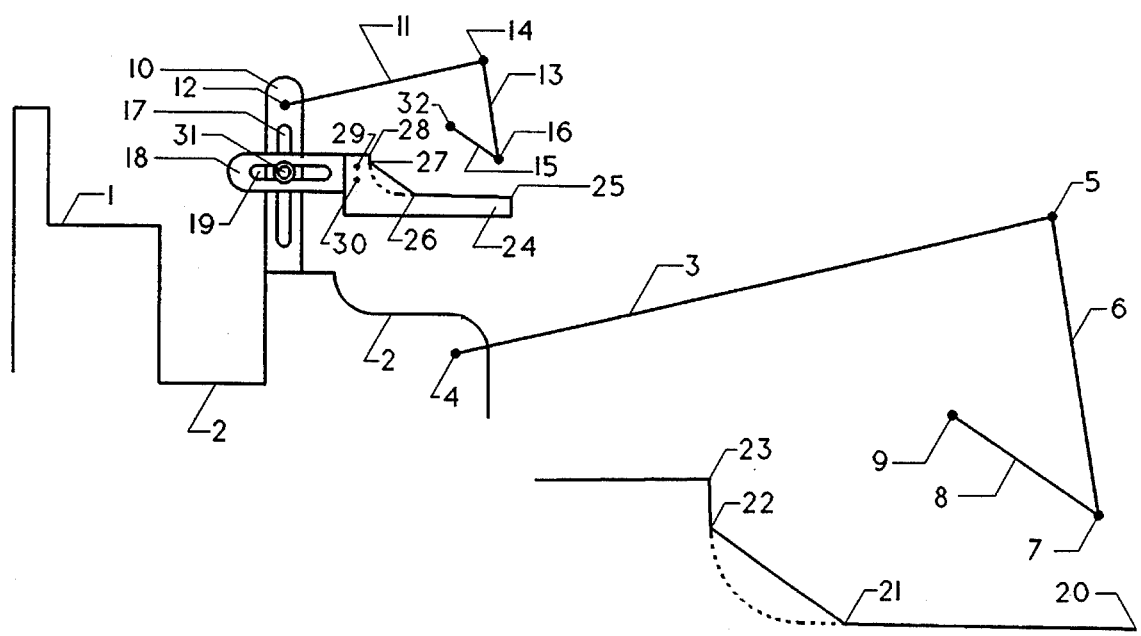
FIG. 1, this invention's first sub-assembly, is a simple side view of the centerlines of the small and large excavator digging members, shown in positions prior to digging earth contours—to be guided by the illustrated template, and a handle that represents the large bucket.

Earlier "Background" descriptions of present day excavator hardware, as compared to proposed future referenced patents' bucket mimic positioning control additional hardware, are sufficiently complete so that they have been, and are, used as a basis for the following added descriptions.
FIG. 1

FIG. 1 and the following descriptions cover a template and its use as an earth contour dig guiding instrument as a first sub-assembly's portion of this invention. This invention's first sub-assembly also includes any referenced patents' modified handles that make them true small scale representations of the length, with tooth and bottom shape of the large bucket. This invention's template and modified handles, can be applied to aid any of the referenced patents' bucket positioning controllers.

The FIG. 1 assembled components and the following procedures can also produce desired earth contours with the aid of this invention's first control system arrangement as described earlier in the Summary and Brief Drawing Descriptions, without further modification.

FIG. 1 is a simplified side view of the centerlines of the large excavator boom, arm, and bucket digging members, and the small boom, arm, and handle. Also pictured is a small scale side view of a desired earth contour guiding template, together with the large scale earth contour that the template can help produce.

A part of this invention has operator's seat 1 supported by upper frame and deck 2. Deck 2 pivotally supports large boom 3 at deck-to-boom axis 4. Large boom 3, at axis 5, pivotally supports large arm 6. Large arm 6's pivoting axis 7 supports large bucket 8 which has tooth edge 9.

Vertical upright 10 supports small boom 11 at pivoting axis 12. Small arm 13 is pivotally supported at axis 14, and small bucket/handle 15 is pivotally supported at axis 16. Slot 17 in upright 10, together with horizontal member 18's slot 19, provide a flexible support for template 24.

The template is mounted on a flexible support and set with the aid of a spirit level with an angle setting arrangement (here sometimes called a topographical level) that allows the template surface to be set at a desired trench bottom's slope regardless of whether the tracks are in a tipped up or down position when the excavator is in a position to dig.

Any of the referenced patents' bucket mimic positioning controllers can have extenders fixed to any of their knobs or levers—providing a handle that is the same true small scale representation of the large bucket's length (with teeth and bottom shape) as the small arm and small boom have as related to their large arm and large boom lengths respectively. A handle, so modified as a portion of this invention, can be scraped along the surface of a template while the handle is being curled through a full 120 degrees, and have the handle-to-small-arm axis' path properly guide the large bucket-to-large-arm axis' path a proper up then down distance so that the large bucket's teeth do not dig undesirably below a large scale earth's flat surface, when guided by a flat surfaced template.

In FIG. 1's illustration of a template's use, a series of parallel contoured excavations is used to complete one half of a drainage ditch. The series of line cuts from 20 to 21, then dotted line to 22, then to 23 forms the end view of one half of a desired drainage ditch, too wide to dig from one side, The end view contour between points 20 and 23 must be dug (symmetrically) from each ditch side because of the extensive width of the desired ditch. The second series of cuts must be made with the excavator's tracks running parallel to the ditch, but on the far side.

Template 24 has been cut in a small scale so that points 25 to 26, then dotted line to 27, then to 28 represent the desired large scale cuts 20 to 21, then dotted line to 22, then to 23 respectively. Template 24 is fastened to support 18 by fasteners 29, and 30, and held in a low, temporary position by fastener 31, Excavation is carried down to depth 20 where the large bucket teeth edge 9 is parked. Template 24 is then raised so that the bucket/handle 15's tooth representing edge 32 meets point 25, and line 25 to 26 is made horizontal, as desired, by a topographical level—being in effect a commercially available spirit level with an angle setting provision on the level's lower side, which can be used for setting a desired slope regardless of the front to back slope of the tracks when the excavator is in a position to dig a trench bottom. Fastener 31 is then fixed.

Excavation can then continue until the bucket/handle's tooth representing edge 32 has scraped across line 25 to 26, then curve 26 to 27, then line 27 to 28, while the main bucket's teeth edge scrapes in synchronism from 20 to 21, then a curve to 22, then 22 to 23 respectively.

The excavator can then be advanced a distance somewhat less than the bucket's width along a short length of the ditch so as to be perpendicular to the required contoured cut. A parallel contoured excavation is then repeated.

The template has a width significantly wider than a small scale bucket width. So, assuming that swing positioning control is included, as in this invention, the handle(s) can guide the bucket in a horizontally curving sweeping action—to gather up earth roll off. Also since this invention's hardware includes handle attachments to make an existing handle's edge and bottom truly representative of the specific bucket's teeth edge and bottom, the correct contour cannot only be cut, but the earth surface can also be smoothed by a handle bottom contact with the wide surfaced template.

A series of parallel contoured excavations can, in the manner described above, complete one side of a drainage ditch.

Alternately, a long ditch-shaped template could be employed along with a specially shaped bucket, tapering back to its rear from a top view. Then, with that facility, a template guided ditch can be dug from one pair of tracks in line with the middle of the ditch.

FIG. 2

Figure 2:
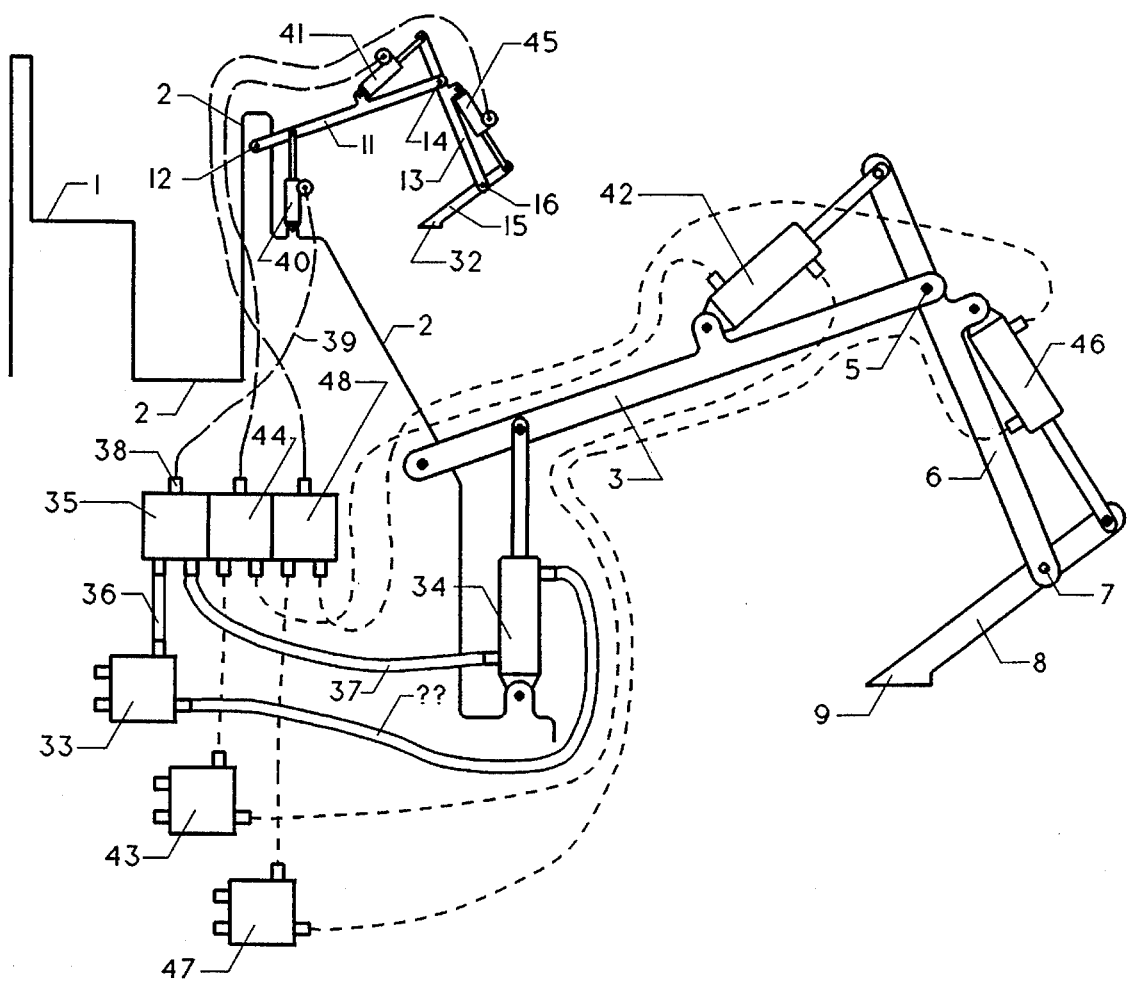
FIG. 2, this invention's second sub-assembly, is a side view of an excavator's large and small digging members and illustrates, for ease of understanding, a new method of the simultaneous actuation of the small and large digging member pairs.

FIG. 2, this invention's second assembly, is included only to illustrate in an understandable way (not proposed for an actual installation) how each boom, arm, and bucket's first hydraulic motor's output shaft, connected through an additional flexible shaft and screwjack, can power into proper position the , small boom, arm, and bucket/handle respectively.

Each motion's first hydraulic motor, which is shown in fluid series with each large member's actuator, has an output shaft as shown coupled to a flexible shaft and screwjack associated with each small digging member. This lineup of hardware is used to maintain the position of each of the pictured controller's small members to be in parallel with its large member. In this manner the past practice of transmitting back each large digging member's angular position to the controller, with transmission lines along adjacent members, is avoided.

Figure 4:
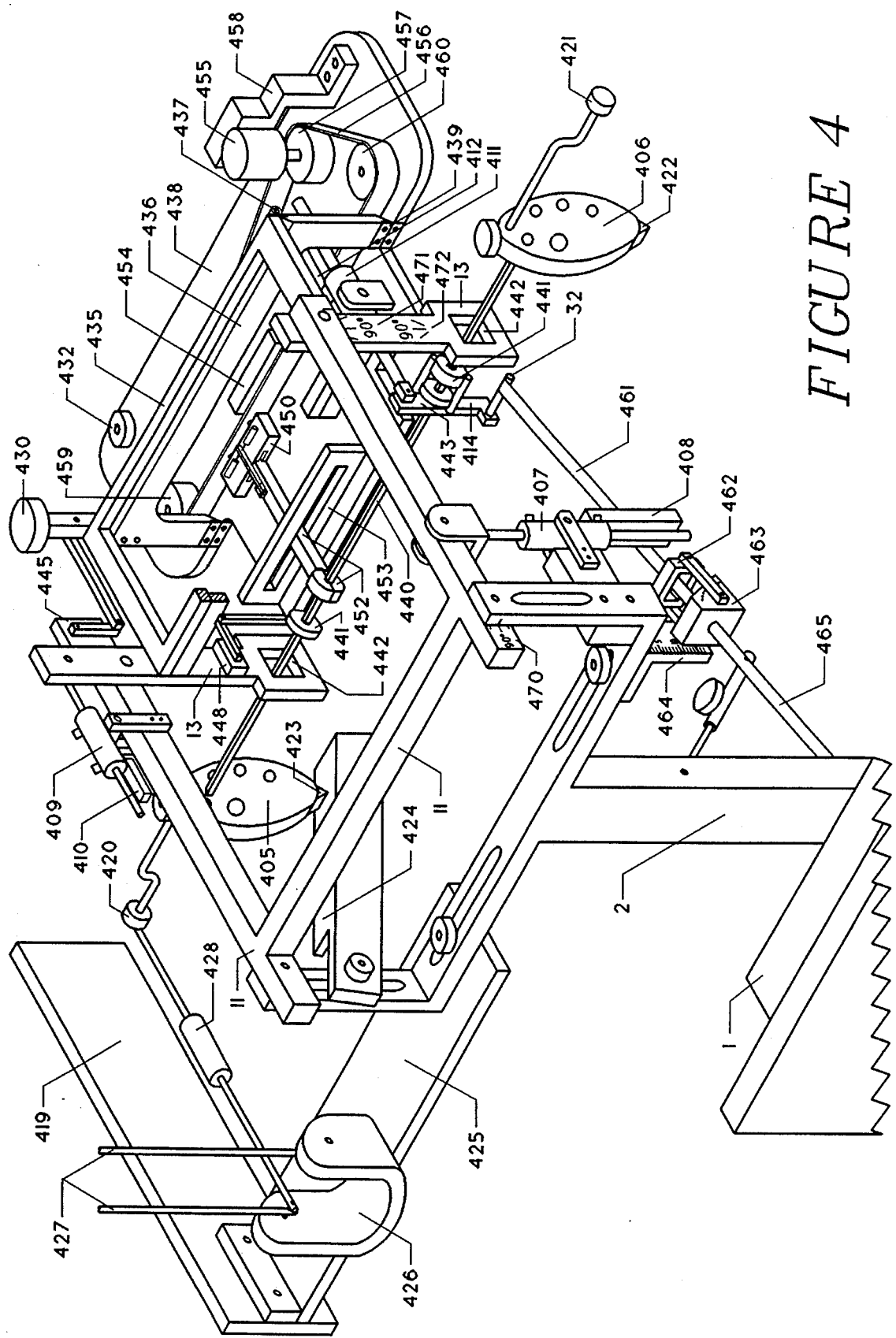
FIG. 4 shows, as a fourth sub-assembly and a portion of the first control system arrangement's part of this invention, an excavator controller with two handles that guide a separate signal device for each boom, arm, bucket, and swinging deck motion.

Mounting and actuation of the separate boom, arm, bucket, and swinging deck motions' signaling devices are shown in FIG. 4 but not here.

Main (large) boom valve 33 transmits fluid to and from boom cylinder actuator 34 through a boom motion's first hydraulic motor 35 by means of piping 36 and 37. Thus providing a unique serial flow of hydraulic fluid that actuates both the large and small booms.

A partial goal of this invention, as stated in the "Background", is to keep each pair of large and small boom, arm, and bucket digging members in parallel positions after they have initially been set in parallel positions. The small boom drive, as shown in FIG. 2, is an example of a mechanical drive train between the boom hydraulic first motor 35 and small boom 11. An improved arrangement, will be shown subsequently in FIGS. 3 through 7. FIG. 2 shows the output shaft 38 of first motor 35, connected to a flexible rotating shaft 39, which in turn motivates linear screw jack 40, that actuates small boom 11. When activated by a handle initiated boom signal device (to be described later in connection with FIGS. 3 through 7) the large boom valve 33 passes fluid in series that drives the boom first hydraulic motor 35 and large boom hydraulic cylinder linear actuator 34.

Here where an identified first hydraulic motor is applied in series, as shown, with only one port of a large member's large actuator, that first motor's shaft goes through a fixed number of revolutions for a given distance of that large actuating cylinder's output shaft's maximum in or out travel. Also, for a given number of input revolutions to each screwjack, the screwjack's output working shaft that is connected to a small member, travels the same distance while fully extending or contracting. Each first motor and its associated screwjack are selected so that while each large cylinder goes through its maximum extension, the associated screwjack also goes through its maximum extension. Further each screwjack is physically positioned so that it drives its connected small member through a given same arc, in synchronism, as its paired large member's arc.

Again, the selected first motors each have output shafts that, for a given number of revolutions, do drive the illustrated small member actuators and hence the small members through an equal arc travel in first one then in the opposite direction. Thus all first motors in this invention have a positive fixed volume of fluid displacement for a fixed number of revolutions in either direction.

Following the above hardware descriptions, boom first motor 35 and large boom cylinder actuator 34 power the small and large booms, 11 and 3 respectively, to remain in parallel positions.

In a similar manner small and large arms 13 and 6 respectively are driven and kept in parallel positions by linear actuators 41 and 42 respectively. Those arms are motivated by a serial flow of fluid through large arm valve 43, to arm first motor 44, and to hydraulic cylinder actuator 42 (that powers large arm 6) then back to large arm valve 43. Arm first motor 44 is connected by the flexible shaft shown to the small arm screwjack actuator 41, that powers small arm 13.

FIG. 2's bucket/handle 15 and large bucket 8 are driven in parallel positions by screwjack actuator 45 and large bucket hydraulic cylinder actuator 46 respectively by a serial flow of fluid through large bucket valve 47, then through bucket first hydraulic motor 48, and then through large bucket hydraulic actuating cylinder 46, then back to large bucket valve 47. Bucket first hydraulic motor 48 is connected by the flexible shaft shown to small bucket screwjack actuator 45.

Reviewing, each pair of small and large linear actuators of a same boom, arm, or bucket type are selected and applied in a similar, parallel, manner and have their effective extended lengths always in the same ratio as the ratio of lengths between each pair. Also, the ratios of the small to the large members within each of those pairs is the same. Thus, it follows that each small and large member of the same type must remain in parallel, after being initially set in parallel.

The swing and propel motions are not shown here in FIG. 2, but will be described later in conjunction with FIGS. 3 through 7.

It must be recognized that any first motor absorbs a very small portion of the power (it's almost free-wheeling) of the passing fluid, in driving its associated small member's actuator. Hence no leaks are expected to be caused by the low difference between in and out fluid pressure.

Having a high torque tie method of keeping the large and small members in parallel is necessary to avoid the possible problem of misguided handle directions. Refer to the "No. 2 Referenced Patents' Problem" in the Background section.

Figure 3:
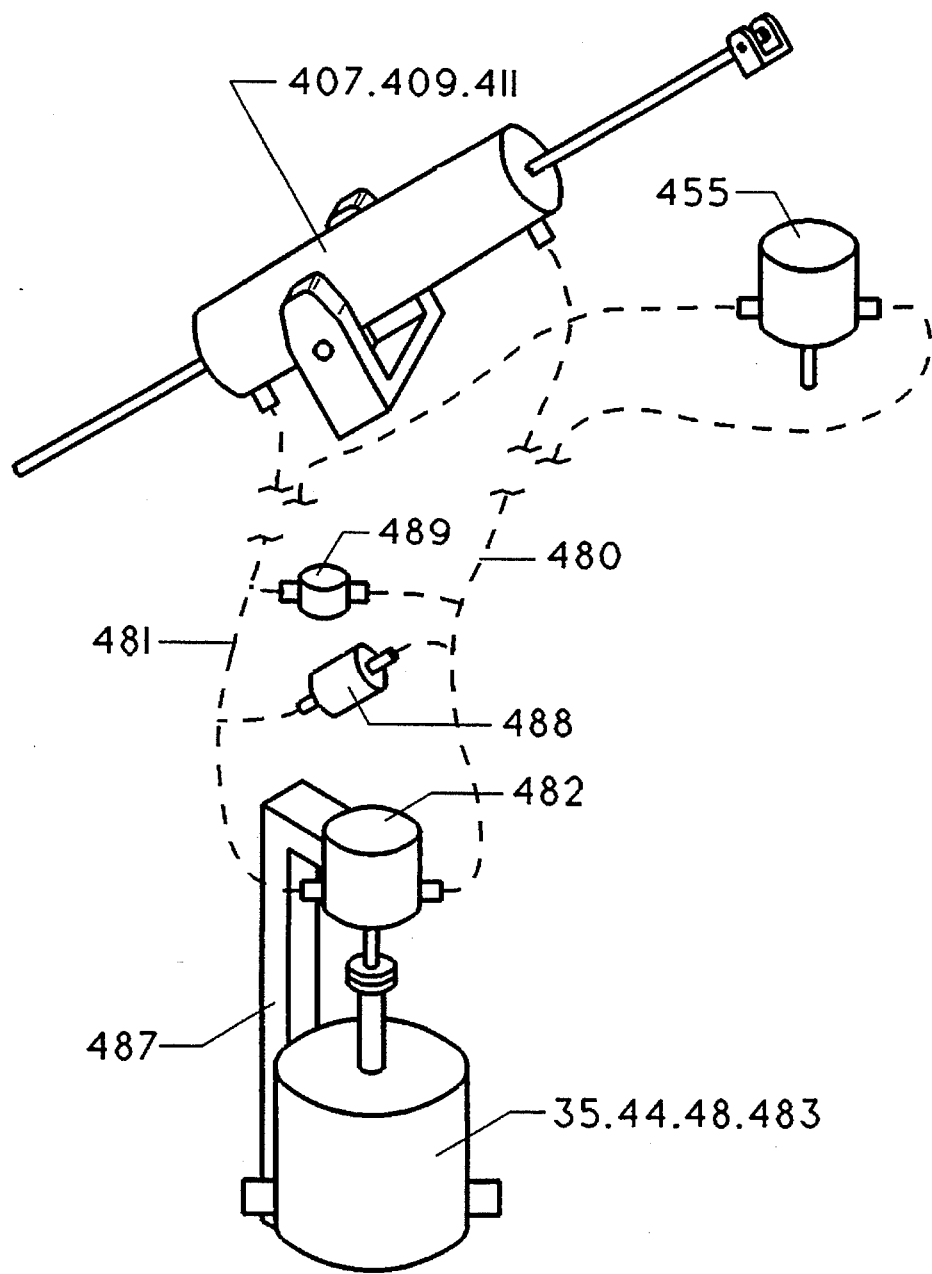
FIG. 3, a third sub-assembly and a portion of a first control system arrangement of this invention, shows a first motor directly coupled to and driving a small pump whose output fluid in turn powers a reversible small member actuator—as needed for each separate small boom, arm, bucket and (modified) swinging deck motion.

The signal devices that initiate movement of small and large members are considered along with FIGS. 4 through 7.
FIG. 3

Four of the FIG. 3 types of third sub-assemblies are required in the first control system arrangement (FIG. 7) in this invention. A separate FIG. 3 type third sub assembly is required to drive each small boom, arm, bucket, and deck motion small member in the FIG. 4 controller sub assembly. Four of the actuators, as pictured at the top of FIG. 3, are located on a controller to be described with FIG. 4.

Double extended, double acting hydraulic cylinder 411 (FIG. 3) which actuates the small bucket in FIG. 4 is the same type, though not necessarily the same size, cylinder 407 which actuates the small boom and cylinder 409 which actuates the small arm (see FIGS. 4 and 7).

Hydraulic pipes 480 and 481 (FIG. 3) are shown with dashed lines, as the connections between the cylinder 411, and its driving, small, reversible, positive displacement, pump 482. (Pump 482 may also be referred to as a rotary unit.) The same type of small reversible 482 pump, though not necessarily the same size, with similar piping connections 480 and 481, is used to drive the small boom, arm, and bucket double extended reversible cylinder actuators. The type 482 pump shown is also employed to power the, FIG. 4, positive displacement reversible rotary motor 455 which motivates the cogged belt representation of the swinging deck.

Each (bottom located) first hydraulic motor in FIG. 3 is in fluid series with a respective large member's actuator (as shown in FIGS. 2 and 7) so that its output shaft's number of rotations position represents its associated large member actuator's position and therefore the position of its large member.

The type of first hydraulic motor 35, 44, and 48 as shown in FIGS. 2, 3, and 7, (whose shaft's instantaneous rotary position is used to represent the separate instantaneous positions of the large boom, arm, and bucket respectively) is also used to represent the positions of its associated large deck motion and lower frame propelling motion large motor actuators (FIG. 7).

The size of the top located hydraulic rotary unit 482 is selected separately for each motion and its shaft's rotary position (example 11.34 revolutions) represents the position of its associated small driven actuator, like small boom cylinder 411. Each motion's first motor and its driven type 482 pump are selected so that their number of revolutions (again example 11.34), for a given measured angular movement of each of their associated member pairs, from a given starting angular position, is the same. Henceforth the type 482 pump refers to the top positioned rotating pump directly coupled to a first motor's shaft for each Bypass valve 488 and relief valve 489 are piped between lines 480 and 481. Valve 488 can be momentarily actuated: when the handle is used to guide each small digging member to be repositioned in parallel to its paired large member; and to reposition the handle to allow a wider deck swinging arc. Relief valve pressure can be set on valve 489 to avoid damage to any fragile or non yielding object contacted by a small member.

Further, the top and bottom located hydraulic rotary units in FIG. 3, as mounted on vertical support 487, would be selected to have any necessary internal gearing, adjacent to an output shaft, in one or both units for each motion. This would assure that even without the coupling between units, their shafts would rotate in synchronism while each pair (one small and one large) of members would be moved in parallel angular synchronism.

The FIG. 3 first motor and small driven pump assemblies are located at available and convenient sites, as are the main prime mover driven pumping source and the large valves, probably to the rear of the excavator, to help provide weight to counter balance the large digging members.
FIG. 4

FIG. 4's controller as a fourth sub-assembly is a part of this invention's first control system arrangement and is further shown in FIG. 7. FIG. 4's controller works to operate first motors 35, 44, 48, 483 (FIGS. 2 and 3) and allow replacement of each flexible shaft and screwjack type combination (FIG. 2) for small member motivation.

Signal, or signalling, devices to be referred to in FIG. 4 are all commercially available, reversing, spring neutral "Off" centered, short movement, low force actuated, stepless output, pilot valves—for the boom, arm, bucket, and swing motions. These types of signal devices were thoroughly described in earlier "Background" information in relation to similar signal devices described in referenced U.S. Pat. No. 3,880,304.

The input shafts, connecting rods and lever linkage for each of the boom, arm, bucket, and deck motions signaling devices pictured in the FIG. 4 controller are somewhat different from each other.

Some FIG. 4 items identified earlier are: operator's seat 1, deck extended controller support 2, small boom 11 and small arm 13. Some FIG. 4 item additions include handles 405 and 406 having tooth edges 423 (not shown) and 422, respectively, small boom cylinder 407 and its position switch 408, small arm cylinder 409 and its position switch 410, also small bucket cylinder 411 and its position switch 412.

Some FIG. 4 General Construction Features

A rectangularly shaped rigid base plate 435, with a large rectangular hole to save weight, is fixed perpendicularly and at equal distances from, the bottom ends of both of the two legs of small arm 13. Wide, rigid, inverted U-shaped plate 436 is hinged, full width, to plate 435 by hinge 437. Rigid, T-shaped control plate 438 is hinged at each left and right hand side to plate 436's lower left and right hand ends by left (identifying pointer not shown) and right hand hinges 439. A counterbalance weight 432 is fixed near the rear end of control plate 438 and counterbalance weight 430 fixed on an upper projection on plate 436.

The multi-sided (square with rounded corners from an end view) control shaft 440, is rotatable in bearings within the left and right support arms 441, which are fastened to the front outsides of control plate 438. In and out and up and down movements of shaft 440 are restricted within the boom and arm signaling-stroke-limiting square holes 442 at the bottom ends of of the legs of arm 13.

Bucket Notion Influencing Construction

Small bucket 15 (FIG. 2) is represented in FIG. 4's controller by projection 414.

FIG. 4's controller in order to influence bucket motion has a bucket pilot valve signal device 443 which has a receptacle which mates with control shaft 440. An body of signal device 443 has an integral collar surrounding its receptacle that is restricted from lateral movement by two fingers as shown that are mounted on the right hand shaft support 441 on control plate 438. With the effect that device 443 cannot move laterally with respect to control plate 438 or small arm legs 13.

Small bucket double extended cylinder actuator 411 is pivotally mounted on control plate 438. Actuator 411's working shaft end is pivotally connected to the bucket signal device 443's housing at a distance that represents in small scale the length of the effective lever arm by which the large bucket is rotated by its large cylinder 46 (FIG. 2). A cutout in control plate 438 surrounds device 443 so that device 443 is unrestricted to be rotated (approximately 120 degrees) by small bucket actuator 411 around the axis of control shaft 440. A projection 414 on device 443's housing has an effective length from control shaft 440's centerline to the tip of 414 that represents (like handles 405 and 406) the length with tooth edge of the large bucket 8 (FIG. 2). Projection 414 constitutes a small scale bucket similar to FIG. 2's 15.

Bucket motion signal device 443: (1) cannot move laterally with respect to control plate 438; (2) can have an output signal initiated by a slight rotation of control shaft 440 with respect to 443's housing; (3) has a housing that can be rotated, following shaft 440's lead, so that the small bucket's teeth edge representation 32 on small bucket projection 414, will rotate in a close following step with handle 406's teeth representing edge 422 and the FIG. 2 large bucket teeth edge 9. Handles 405 and 406 are fixed to control shaft 440's ends so that the handles' tooth representations 423 (not shown) and 422 are in a line parallel to control shaft 440.

Bucket Motion Operation

If either handle 405 or 406 is rotated in a curling direction, the initial slight movement carried through control shaft 440, through the mating receptacle of the bucket signaling device 443, and against a compression, shaft centering spring at the outside of the small curling direction valve within pilot valve signal device 443; that rotation causes a curling output from device 443. That 443 output is passed through lines (not shown) and input to the large bucket valve 47 (FIGS. 2 and 7). A prime mover driven main hydraulic fluid pumping source (pictured in FIG. 7, but not shown here) supplies fluid at high pressure to each large valve to be deployed as directed by the operator through initiation of the separate pilot valve type signal devices. The output from the bucket motion signal device 443 having been input to the large bucket valve 47 causes a curling directed fluid output from the large bucket valve 47 (FIGS. 2 and 7). That valve 47 released pressurized fluid is passed in series to the bucket first hydraulic motor 48 (FIG. 2), main bucket actuator 46 (FIG. 2), then back to valve 47.

The large bucket first hydraulic motor 48, in FIG. 2, drives a screwjack type of linear small boom actuator through a flexible shaft. But with the FIGS. 3 and 4 portion of the first control system arrangement, the small bucket's double extended linear cylinder actuator 411 in FIG. 4 is powered by fluid from the small, type 482, reversible pump (as is shown in FIGS. 3 and 7). The small bucket motion's type 482 pump (FIG. 3) is shown directly coupled to and driven by the bucket motion's first hydraulic motor 48. Again, the coupled bucket motion's first hydraulic motor assembly (without actuator 411 which is mounted on the FIG. 4 controller) is located like all other motion's FIG. 3 assemblies (without the top located acuators) in an available convenient space between the large valves and the FIG. 4 controller—probably near the rear of the excavator to help counter balance the weight of the large digging members.

Cylinder 411 rotates bucket signal device 443's housing in step with the large bucket cylinder 46's rotation of the main bucket 8 in FIGS. 2 and 7. An opposite rotating bucket opening handle dumping motion is carried out in a similar manner as initiated by a small dumping direction valve within pilot valve 443.

Curling or dumping of the large and small bucket members continues at the pace set by the handle(s) and their control shaft 440. When the handles stop, bucket signal device 443's housing catches up with the control shaft 440's last signaled slightly leading position, causing a cushioned stop. Device 443's housing is always progressively repositioned to cancel the handles' initiated motion until that initiated progressive motion ceases.

Following the above explanation, and in addition to the review in the Summary, each handle tooth edge 423 (not shown) and 422 with a slightly leading position guide the small bucket's tooth edge 32 (FIG. 4) to always rotate in step with large bucket tooth edge 9 (FIG. 2).

FIG. 4's Arm And Boom Motion Influenced Construction

The coordinated boom and arm motions effect the location of the far end of large arm 6 at the large arm to large bucket axis at point 7, (FIG. 2) called a third axis. The third axis be shown to be controlled by the positioning of the far end of small arm 13 at the pivoting axis between the small arm 13 and small bucket 15—a position taken by control shaft 440 and called a sixth axis.

Arm pilot valve signal device 446 is fixed to the left of arm 13 so that its input lever can be actuated by a rod that is flexibly connected to the input lever on the left hand end and to an upper extension (that mounts balancing weight 430) of the inverted U-plate 436, on the right hand end of that connecting rod. Plate 436 with the aid of connecting hinges 437 and 439, moves in concert with an arm-in and an arm-out signaling movement of the handles 405 and 406, control shaft 440, and control plate 438.

Boom pilot valve signal device 448 is shown mounted on the inside of the left leg of arm 13. The input lever on boom signal device 448 has its end as shown flexibly connected by a rod to control plate 438 so as to have the boom-up and boom-down movements of the control shaft 440 transmitted through the control plate 438 to boom signal device 448.

FIG. 4 shows that the rods connected to the boom and arm signal device levers are long as compared to the length of the in-to-out or up-to-down movement respectively of the control shaft while it is confined within square holes 442. Therefore any control shaft movements made at right angles to either boom or arm signal device's connecting rod have an insignificant effect on either connecting rod's signalling input.

FIG. 4's Boom and Arm Motion Operation

A handle movement in a vertical plane, disregarding rotation, is broken down into components perpendicular and parallel to arm 13, by means of control shaft 440. Movement components parallel to the small arm are applied to boon signal device 448 by the above described connecting rod and lever arrangement. Perpendicular movement components are applied to arm signal device 446 through the connecting method reviewed above. Outputs from either or both pilot valve signal devices 448 and 446 are transmitted to and actuate the amplifier input ends of their respective large main boon and arm valves 33, and 43, respectively (FIGS. 2 and 7). High pressured fluid is presented by the prime mover driven main pumping source to the large main valves for all motions (shown in FIG. 7, but not shown here). Valves 33 and 43 release pressurized fluid to each first boom and first arm hydraulic motor 35 and 44 respectively in FIGS. 2 and 7. Each of those first motors in the FIGS. 2 and 7 is coupled to, and directly drives a small boom and small arm pump like 482 (FIGS. 3 and 7) respectively. Each small boom pump and small arm pump forces fluid to a separate small boom motivating cylinder 407 and small arm motivating cylinder 409 respectively in FIGS. 3, 4 and 7. Fluid flows in series from first motors 35 and 44 to large boom and arm cylinder actuators 34 and 42 and returns to large valves 33 and 43 respectively (FIGS. 2 and 7). Thus cylinder 407, drives small boom 11, (FIGS. 3, 4 and 7) and cylinder 34 drives large boom 3 (FIGS. 2 and 7) in parallel. Also, cylinder 409 drives small arm 13 (FIGS. 3, 4 and 7) and cylinder 42 drives large arm 3 (FIGS. 2 and 7) in parallel. So the progressive guiding path taken by control shaft 440 in small scale, is repeated by the pivoting axis 7 (FIG. 2) between the large arm and bucket, in large scale. When the handle motivated control shaft 440 stops, axis 7 comes to a cushioned stop as signal devices 448, and 446 have their (FIGS. 4 and 7) input levers and shafts reach a spring centered, neutral, "off" (no valve output), position.

FIG. 4's Swinging Deck Motion's Hardware and Operation

Swing tee assembly 452 has a split sleeve bearing at the base of its stem that mates with a circular groove in control shaft 440. At the head of tee assembly 452 there is a side groove 473 (shown in the enlarged device 450, FIG. 5 view), parallel to control shaft 440 that can mate with and slide laterally on the tongue at the top of stem 452.

The middle of stem 452 mates and slides at a right angle within a slot in guide plate 453. That slot is parallel to control plate 438, and so the stem 452 slides in parallel to the control plate. Guide plate 453 is shown fixed perpendicularly to control plate 438 and parallel to control shaft 440.

Swing position switch 454, which indicates in small scale the step-by-step upper deck swing position, is fixed perpendicularly to the control plate 438, and parallel to guide plate 453 and swing signal device 450. Switch 454 would typically be desired when applying programmed trench digging.

Small swing position hydraulic receiver motor 455 is powered like all other FIG. 4's small member actuators by a separate hydraulic rotary pumping unit like 482 shown in FIG. 3 and 7. This 482 type of hydraulic rotary unit, in review, is used as a separate pump for each small boom, arm, bucket, and deck motion in FIG. 4's controller.

Swing motor 455 drives notched belt 456 with notched pulley 457 of a selectable diameter. Motor mount 458 is pivoted until belt 456 is made taut—then fixed. Belt 456 is positioned in parallel and between swing position switch 454 and swing movement signaling device 450 by the plate 438 mounted idler pulleys 459 and 460. Swing signaling device 450 is fixed to belt 456 by fasteners 503 as shown in an enlarged view in FIG. 5. Swing tee stem's split bearing allows shaft 440 to rotate inside where stem 452 grasps shaft 440 at a right angle. So shaft 440 can rotate with respect to stem 452 but side-to-side movement of shaft 440 is transmitted to stem 452. Stem 452 mounts an in-line projection 504, as pictured in FIG. 5.

Swing Notion Operation

When either or both handles 405, and 406, with control shaft 440, are moved progressively to the right, projection 504 actuates the right hand section of reversible pilot valve 474 (FIG. 5) of swing signal device 450 against the compression centering spring within that small right hand deck valve. An output from the small right hand deck valve of pilot valve 474 (FIG. 5) actuates the main hydraulic swing valve 50 (FIG. 7) whose released fluid motivates a first hydraulic motor 483 (FIG. 3) which is connected to and drives a type 482 small pump (FIG.3). The pump 482 (FIG. 3) then, in turn, drives small swing receiving hydraulic motor 455 (FIGS. 4 and 7).

The released fluid from the main swing valve 50 (FIG. 7) also drives a large rotary swing motor 51 (FIG.7) for the large deck 54's (FIG.7) swing rotation. Motor 455 (FIGS. 4 and 7) drives small deck swing belt 456 and swing signal device 450 simultaneously with motor 51's (FIG. 7) driven deck 54 (FIG. 7).

When the handles stop their progressive linear lateral movement, swing signal device 450's valves, attached to belt 456, becomes centered about projection 504 (FIG. 5), and the swing motion comes to a cushioned stop.

Swing receiving motor 455's notched pulley can be changed to a pulley having a different diameter, thus affecting the travel distance of the swing signal device, and so changing the ratio of a handle's stroke length which continues the signal device output to the width of the excavator's swing arc.

In review, as a part of an effort to save controller width, the swing motion in FIG. 4 uses the linear change in position between a belt mounted signal device housing 450 and the swing stem projection 504 (FIG. 5), as guided by the handle's lateral positions, for a signal output.

FIG. 4 Fourth Sub-Assembly's Auxiliary Hardware

The first control system arrangement includes the following auxiliary apparatus as a portion of this invention.

A swing stopping enabling guide plate 419 can be mounted on either or both sides of the controller. Swing plate strikers 420 and 421 can stop the handle on contact with a preset guide plate 419, when desired, accurately over a trench being dug after returning from a dumping action. Striker 420, in conjunction with a proper height and width setting of swing guide plate 419, will only allow the bucket to safely pass over a truck's body to dump when striker 420 and handle 405 clear the top of plate 419. A right hand located guide plate (not shown) could be applied in a similar manner for actions involving limits to right hand swinging motions. Each striker has: (a) an internal electrical switch contact output for possible use when installing programmed control; (b) a mounting shaft in line with shaft 440 and (c) an adjustable (hand width) spacing clamp provided for each handle. A clamping knob with set screw is shown on top of handle 406.

Each handle in FIG. 4 has an edge, 422 and 423 (not shown), as a representation of the tooth edge 32 of the small bucket and tooth edge 9 of the large bucket—as shown in Figs. 1 and 2. Handles 405 and 406 also have bottoms shaped to represent the bottom of the large bucket. The small bucket's tooth edge 32 is represented by tooth 422 on right hand handle 406 and tooth 423 (not shown, but in the same position as 422) on left hand handle 405.

The handle swing stop/permit guide plate 419 is held in a preset position by flexible mounting bracket 425.

A flexibly mounted plate type template 424 is set and used, when desired, to guide shave type trench digging as may be desired for automated trench excavations.

An operator's arm swinging support 426 is shown with adjustable length overhead lines 427 to support a mid forearm's height, and has an adjustable length tie rod 428 connecting to striker 420. That method always maintains a properly located fulcrum type of forearm support with respect to the handle, that will stay in place under any operator's forearm while guiding that handle.

Thus, with the aid of: (a) the operator's balancing forearm fulcrum support, with its adjustable support length from the striker; (b) counter balancing controller weigths 430 and 432; and (c) spring centered signal devices; a neutral, off (meaning zero output) position can be maintained without an operator's touch. Also, an operator's downward elbow movement can cause a "boom up" signal, for example, pivoting from the the fulcrum, with very little effort.

FIG. 4 illustrates how the angle between each small supported and supporting member can be determined with the markings 470, 471, and 472 shown. Similar markings are included on the large digging members and can be seen from the operator's cab viewpoint. Further, a described normally closed bypass valves (type 488 valve, FIG. 3 for each motion) can be actuated allowing the large and small boom pairs, the large and small arm pairs, and the large and small bucket pairs to be placed in parallel. Thus allowing ropositioning of control shaft 440 to be in an equivalent small scale position to axis centerline 7 (called a third axis), and allowing the rotating angular positions of handles 405, 406, and small bucket 414 to be in parallel with large bucket 8, FIG. 2.

In a similar bypass valve operation manner, the lateral position of the handles can be set to allow a lateral hand movement that would permit the widest continuous swinging deck arc desirable. This repositioning activity, as noted earlier, is carried out while the prime mover driven pressured hydraulic system is deenergized.

Tape switch 463 is mounted adjacent to trench bottom depth gage 464 that indicates distances below large boom to deck axis 4 (FIG. 2). Small bucket tooth edge 32 pivotally grips the end of tape 461. Tape 461 is fed through pivoting feeler 462 on tape switch 463. Tape switch 463 is adjustably positioned and held by fixture 465. FIG. 4's tape switch and its mounting method allows: detection of the large bucket teeth positions with regard to a desired large scale trench bottom; indication of the depth that the bucket teeth are below ground surface level; and an indication of the slope of the small bucket's tooth edge as it moves along the trench bottom.

Template 424 can become a flexibly sloped ramp, as shown, to be used to guide shave type digging when programmed control is desired.

Controller member angular degree markings 471, and 472 noted earlier, are located on the right side of small arm 13, and markings 470 on the right side of boom 11, with an index mark on the adjacent members. Similar markings (not shown) would be placed on the left side of the main members—all to facilitate initial paralleling of equivalent large and small members.

Differences Between This Invention's And Former Patents' Motivation Of Small Members When referenced patents have their linkages intact between their driven large and small members, and those members' associated separate actuators, their large slave members should mimic their small master member's positions. However, if one or more of the large member-to-actuator linkages were disabled, neither the large members nor small members could be motivated by the handle initiated signal devices. However, uniquely with this invention's arrangements, even with the large actuator linkages to the large members disabled, the small master members would still be guided through an operator's handle series of desired small scale positions. Thus, with this invention's first control arrangement (including FIGS. 3, 4, 5, 6, and 7) each large slave bucket, arm, and boom member does constantly mimic and follow the positions of each of their separate equivalent small members. This design approach is important in maintaining the integrity of handle digging directions as reviewed earlier regarding referenced patents' problems.

The tape switch 463's indication of the small bucket teeth edge's position, and the FIG. 1 template 24, both of which facilitate trench digging depth and slope control, could not be accomplished satisfactorily if each large member did not accurately mimic, in a common large scale, the length and angular positions of each equivalent small scale member including the buckets' (teeth) edges.

FIG. 5

Figure 5:
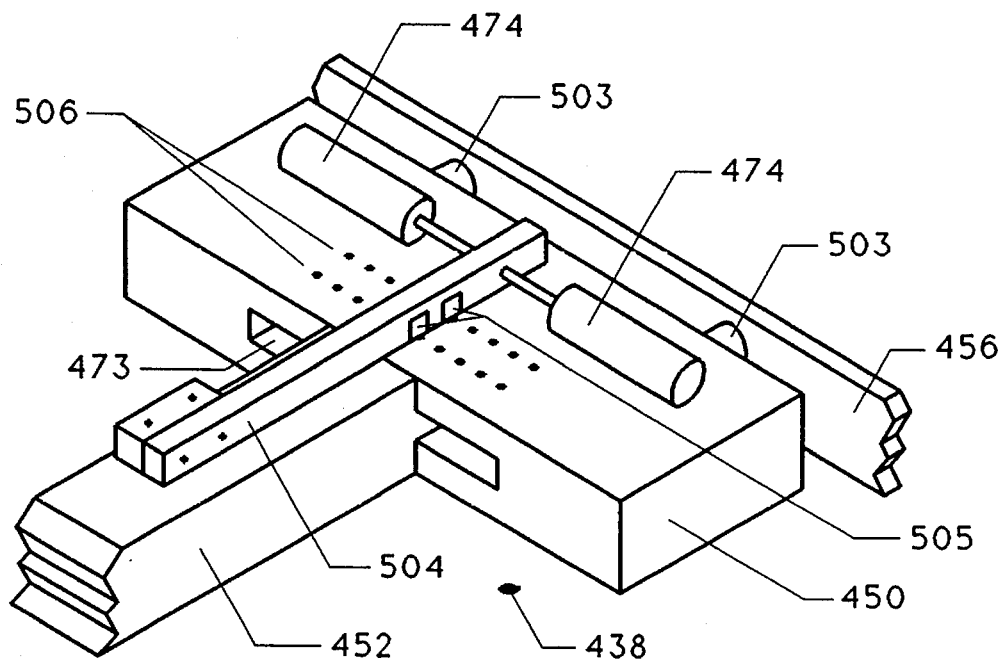
FIG. 5 is an enlarged view of the swing signaling device shown in FIG. 4.

FIG. 5 is an enlargement of the swing signal device 450, shown in FIG. 4. The slot 473, together with 452's tongue, allow the handles, control shaft, stem 452, and stem projection 504, to produce output signals from small valves 474. Device 450 is fastened by fasteners 503 to swing belt 456.

FIG. 5 shows a typical method of sensing a signaling device's output position by a swing signal device electrical output position switch 506. Switch 506 is similar to the switches for other motions in having a moving contact that bridges a number of linear regularly placed pairs of stationary contacts. Bars 505 on insulated stem 504 make contact with regularly positioned pairs of stationary contacts on 450's insulated surface, so that the magnitude of a swing signal output, as indicated by a distance from the neutral, off, position can be detected and transmitted if desired when employing programmed control for trench digging.

FIG. 6

Figure 6:
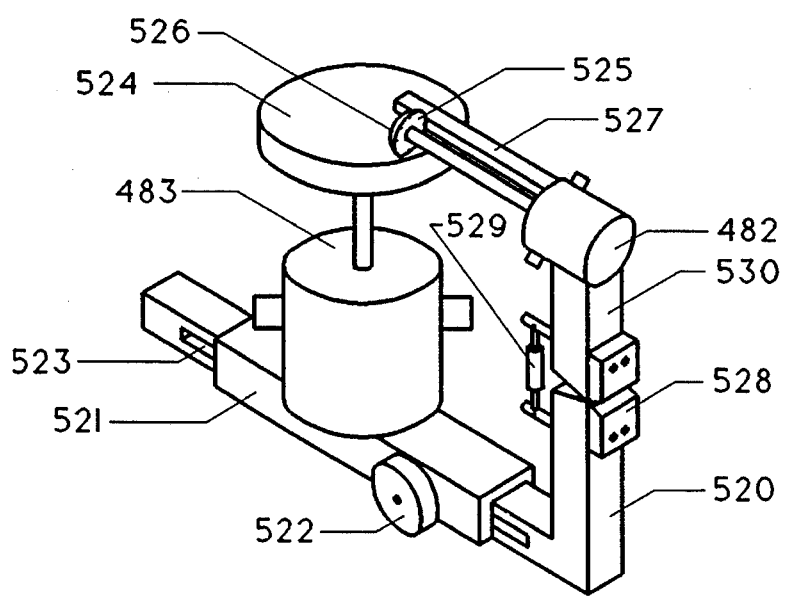
FIG. 6 as a fifth sub-assembly's part of this invention, shows a first motor's variable speed output hardware—having a dual use as a way to: (a) obtain a comfortable lateral handle moving distance when guiding a swinging motion; or, (b) used to preselect a desirable propelling distance.

FIG. 6 is a fifth sub-assembly that includes hardware for obtaining a variable output speed from a first hydraulic motor. The FIG. 6 sub-assembly is an optional arrangement of the swing motion's hardware in the first control system arrangement. FIG. 6 with a change in description for item 482 and added description for items 526 and 527, provides hardware for accomplishing a programmed propelling distance.

As optional swing motion hardware, and as a part of this invention, FIG. 6 can provide, in effect, a stepless change in the FIG. 4 swing belt's driving pulley diameter without the need to change the driving pulley. That change in effective diameter would allow a desired change in the required length of the handle's lateral swing guiding movement for a given swinging deck arc. The larger the effective diameter of the cogged belt driving motor's pulley, the greater the lateral movement of the cogged belt attached swing signal device that represents a given number of the swing motion's first motor's revolutions hence given angular travel of the large swinging deck. So, a greater length of lateral handle movement would be required for a progressive signal device initiating movement and associated given large deck's arc.

FIG. 6 sub-assembly's base 520 is mounted in the excavator's cab so that channel 521 member's positioning and tightening knob 522 is accessible to the operator. Channel 521 mounts the familiar type of first hydraulic motor 483 that can be separately driven by fluid in series between a propelling motion's large main valve 52 (FIG. 7) and its large actuator 53 (FIG. 7), and between the swing motion's large main valve 50 (FIG. 7) and its large actuator 51 (FIG. 7). Channel 521 (FIG. 6) is held to base 520 by bolt 522 through slot 523. Motor 483's shaft mounts a disk 524 on which rubber edged wheel 525 is forced by spring 529 to drive a type 482 pump.

A modified FIG. 6 sub-assembly can be employed when a certain propel distance is desired. With that propelling goal the FIG. 6 sub-assembly, as a part of this invention, is modified by having the small pump 482 simply become a bearing for wheel 525's shaft. Then, the 482 bearing mounts a revolutions counting switch 527. Adjustably mounted stationary contacts in conjunction with effectively placed conducting bars 526 on the rim of wheel 525 of counting switch 527 help allow a preset contact output for every portion of a rotation, or many rotations, of disk 524. The preset number of "counts" on switch 527 can represent the distance of an excavator's track travel for a given number of propelling motion's first motor revolutions and placement of disk 525 at a radius on driving dish 524.

Positioning first motor 483 and tightening bolt 522, to the left or right can achieve a variation in outputs depending, for example, on the desired propel distance before repeating trench digging.

Hinge 528 together with spring 529 cooperate to keep support 530, of small disk wheel 525 in pressured contact with disk 524.

When the FIG. 6 assembly's rotary unit 482 is used for the FIG. 4 swing motor 455's pumping source as a portion of the first control system arrangement, the switch 527 is not needed. Then, as noted above, the associated variable output of rotary pump 482 permits setting of an optimal lateral handle movement necessary to cause a given swing arc.

FIG. 7

FIG. 7 is a schematic drawing of the first control system arrangement's components and interconnections. A minimum of three hydraulic, pneumatic or electrical transmission lines are shown between each motion's signal device and the large valve that that signal device controls. The piping for the working series flow of fluid as shown earlier in FIG. 2, is repeated here from each separate motion's large (main) valve, through its first motor, through its large actuator, then back to its large valve. The large valves shown for the boom, arm, bucket, deck, and propelling lower frame are 33, 43, 47, 50, and 52 respectively. The first motors shown for the boom, arm, bucket, deck and lower frame are 35, 44, 48, 483, and 483 respectively. The large actuators for the boom, arm, bucket, deck, and lower frame are 34, 42, 45, 51, and 53 respectively. The large boom, arm, bucket, deck, and lower frame are 3, 6, 46, 51, and 53 respectively. The four separate small pumps driven by the first motors for the boom, arm, bucket, and deck are all shown with the same identifying number 482. The small boom, arm, bucket and deck actuators driven by the four separate type 482 pumps are 407, 409, 411, and 455 respectively. The small boom, arm, bucket and deck members are 11, 13, 414, and 456 respectively.

The direction and speed signal devices for the boom and arm motions are 448, and 447—shown as in FIG. 4 mounted in line with and perpendicular to, the small arm 13 respectively. The boom and arm motion signal devices are shown, as are other items, in better perspective in FIG. 4. The bucket motion signal device 443 is schematically shown as in FIG. 4 as it can be rotated by the flexible connection to the working shaft of the small bucket actuator 411. The deck motion signal device 450 is shown as in FIG. 4 mounted on the small deck linear portion of cogged belt 456 and actuated by a connection to control shaft 440 and handle.

It would clutter FIG. 7 and thwart the goal here of showing line connections among large valves, actuators, and first motors, and small pumps, actuators and signal devices to repeat the mechanical connections, as shown in FIG. 4 between the control shaft and each boom, arm, bucket, and deck signal device. So, those connections have not been repeated.

FIG. 7 does include the common , present day piping between the main pumping source and the five large valves. Also the schematic representation of the FIG. 6 propel revolutions counting switch 527 is repeated here, and the schematic representation of the present day common lower track frame 55 and deck swing support 54 are included.

This FIG. 7's arrangement repeats the FIGS. 3 and 4 influenced layouts in that all boom, arm, bucket and swinging deck motion's positive displacement first motors 35, 44, 48, and 483 are shown here coupled to, so as to directly drive, each separate motion's positive displacement type 482 rotary pump, These separate pumps are then shown piped to drive each separate small boom, arm, bucket, and swinging deck member's actuator 407, 409, 411, and 455 respectively, Again, each motion is pictured separately and schematically without the common signalling devices' initiating control shaft 440, so that piping lines can be simply traced without crossings.

Most of the working hardware that is common to all present day excavators with a 360-plus degree deck swinging capability, as described in the "Background", is shown in this FIG. 7, That hardware is shown schematically and includes: the main hydraulic, prime mover driven, pumping source 49, the large swinging deck's large main valve 50, the large deck's rotary actuating motor 51, the large (main) propelling valve 52, the large rotary propelling motor 53, the large upper frame and deck representation 54, and the driven lower frame and track representation 55.

Detailed construction and operation of each motion's initiating action is described with FIG. 4.

The swing motion's signal device is again shown (schematically) mounted on the small deck/belt 456 so as to be actuated by a lateral movement of handle 406 and shaft 440. Therefore, handle 406's lateral movement and large deck representation 54's rotational swing movement will always be in step.

The boom motion's signal device 448, as noted earlier with FIG. 4, is shown (schematically) as being mounted on, so as to be actuated in line with, small arm 13. Therefore, a handle 406 with control shaft 440, movement in line with small arm 13 will, as a part of this invention, produce a given output regardless of the angle between the small boom and small arm.

There could be for example 61.4 first boom motor's rotations associated with a small boom's travel from a 45 degree upward to a 45 degree downward slope. The force and power of the high pressured fluid when directed through a first motor can easily overcome the relatively small force and power needed by a first motor to drive each associated small member.

Arm signal device 447 is shown (schematically) confirming that a control shaft signaling movement perpendicular to small arm 13 will initiate actuation of the small and large arms in parallel.

A slight rotation by control shaft 440 driving bucket signal device 443's hollow shaft with respect to its housing, as noted earlier with FIG. 4, initiates synchronous rotation of 443's housing, attached small bucket 414, and large bucket 8.

Each of the boom, arm, bucket, and deck motion's operating hardware has been reviewed with the FIGS. 3 and 4. The handle and control shaft's actuation of each small member mounted signal device initiates a high pressured fluid output from its associated large valve that causes a desired direction and speed of: the small member as initiated by a first motor; and at the same time a large paired member as powered by a serial flow of fluid to and from the first motor. When a guiding handle movement stops, the housing of the small member mounted signal device catches up to the slight signal leading position of its input lever, shaft, or projection as shown in FIG. 4 and 5—thus allowing a cushioned stop.

I claim:

1. A control assembly for a hydraulically powered excavator which includes control sets of associated large operating boom, arm and bucket members that are maneuvered in digging operations and small mimicing boom, arm and bucket control members corresponding, respectively, to the large operating members such that said small members are selectively movable into positions equivalent to the positions into which said large members are moved; said control assembly comprising:

an actuator means to activate movement of each control set;

each control set including an associated large member, parallel small member and interconnecting sub-assemblies to provide control, each sub-assembly comprising:

(a) signalling means (448, 446, 443, 450) supported on an associated small member (11, 13, 414) and activated by movement of said actuator means to control the activation of a hydraulic control valve (33, 43, 47);

(b) large hydraulic positioning means (34, 42, 46) to move an associated large member (3, 6, 8) of said set as directed by said hydraulic control valve;

(c) small hydraulic positioning means to maintain the associated small member of an associated set parallel with its associated large member;

(d) fluid conducting means arranged to conduct fluid serially in a reversible manner from said hydraulic control valve to said small hydraulic positioning means and then to said large hydraulic positioning means.

2. The control assembly of claim 1 wherein said small hydraulic positioning means for each control set comprises:

a first motor which is in series with and between said hydraulic control valve and said large hydraulic positioning means, said first motor having an output shaft;

a hydraulic pump with an input shaft mechanically coupled to said output shaft of said first motor;

a hydraulic moving means connected to an associated small member to move that associated member;

fluid transmission means to conduct fluid from said hydraulic pump to an associated hydraulic moving means;

wherein movement of fluid through said fluid conducting means and said first motor causes said first motor output shaft and said hydraulic pump input shaft to turn which causes fluid to flow from said pump to said hydraulic moving means which makes its associated small member move parallel to its associated large member.

3. The control assembly as in claim 2 further comprising a control set to operate a swing motion of said excavator; wherein said hydraulic moving means for said swing motion is a hydraulic motor.

4. The control assembly of claim 2 wherein said hydraulic moving means for said boom, arm and bucket motions are hydraulic cylinders.

5. The control assembly of claim 2 wherein said fluid transmission means has an output and return line between said hydraulic pump and said hydraulic moving means; and a normally closed bypass valve being located between the output and return lines which when actuated allows a direct flow of fluid between an input and output port of said associated hydraulic moving means so that said associated small member can be repositioned parallel with its associated large member.

6. A combination controller and mimicing device for a hydraulically powered excavator which includes small boom, arm and bucket members which correspond with associated large operating boom, arm and bucket members that are maneuvered in digging operations, respectively, such that said small members are movable into positions equivalent to the positions into which said large members are moved as directed by said controller, said controller and mimicing device comprising:

a support mounted on the excavator;

a small boom member pivotally attached to said support and extending forwardly therefrom, said master boom having attached thereto a motion causing means to move the small boom member;

a small arm member pivotally attached to a front portion of said small boom member and extending outwardly therefrom, said small arm member having a motion causing means to move the small arm member;

a first plate fixedly mounted to said small arm member intermediate the ends thereof and extending forwardly therefrom;

a second plate pivotally attached to a front portion of said first plate and extending outwardly therefrom;

a control plate pivotally attached at a mid-section thereof to the bottom of said second plate and having a forward and rear portion, said rear portion extending rearwardly towards said small arm member;

a control shaft longitudinally slideable and rotatably supported on the rear portion of said control plate;

a small bucket member positioned on said control shaft intermediate its ends, a first signal device to sense rotation of said control shaft, said small bucket member having a motion causing means attached thereto to rotate said small bucket member and first signal device;

a second signal device to sense movement of said control shaft perpendicular to said small arm member attached between said small arm member and said second plate;

a third signal device to sense movement of said control shaft parallel to said small arm member attached between said small arm member and said control plate;

said first, second and third signal devices having movement limiting stops thereon to limit movement of the control shaft; and wherein selective movement of said control shaft, control plate and second plate is sensed by said signal devices and used to direct movement of said large members and simultaneous movement of said small members.

7. The controller of claim 6 wherein said controller additionally controls a swing motion of a large deck of said excavator by providing:

a split sleeve bearing fixedly attached to an assembly and mating with a circular groove in said control shaft to prevent longitudinal sliding of said control shaft with respect to said bearing;

said assembly extending forwardly over said rear portion of said control plate and having slidingly attached thereto a fourth signal device to sense side-to-side motion of said control shaft, wherein side-to-side movement of said control shaft controls a swing movement of said excavator's deck;

said fourth signal device having movement limiting stops thereon to limit movement of said assembly; and a motion causing means to longitudinally slide said fourth signal device with respect to said assembly.

8. The controller of claim 7 wherein said signal devices are hydraulic or electric pilot valves.

9. The controller of claim 8 wherein said signal device for said swing motion comprises:

a pair of small pilot valves mounted on said control plate to sense side-to-side movement of said assembly.

10. The controller of claim 9 wherein a motion causing means for the swing motion comprises:

a plurality of pulleys on said control plate for movably mounting a belt means;

said fourth signal device being fixedly attached to a point on the periphery of said belt means such that when said control shaft and said assembly slides side-to-side, the fourth signal device is actuated and the belt means moves around the pulleys accordingly;

a small swing motor coupled to an axis of rotation of one of said pulleys.

11. The controller of claim 6 further comprising at least one handle fixed to at least one end of said control shaft for gripping by the operator.

12. The controller of claim 11 wherein each handle is representative of a length of said large bucket member with a tooth edge and each handle has separate finger placement positions that allow a full 120 degree curling rotation with a relaxed hand grip.

13. The controller of claim 12 further comprising: at least one template with a selective mounting means which can be followed by one of said handles to direct an associated large member to move in a specified path.

14. The controller of claim 11 further comprising:

at least one guide plate having a selective mounting means on said support; and a striker mounted outside of each handle to strike the guide plate to prevent lateral movement until the large bucket member has cleared a required height.

15. The controller of claim 14 further comprising:

a forearm balancing support hung from the operator's cab of said excavator and having an adjustable length rod connecting said balancing support to an end of one of said strikers.

16. The controller of claim 6 further comprising:

a set of markings indicating an angle between each small member and an associated connection to a next small member; and a set of markings indicating an angle between each large member and an associated connection to a next large member.

17. The controller of claim 6 further comprising: an adjustable counterweight mounted on said second plate and an adjustable counterweight on said control plate to maintain the controller in a neutral, movement preventing position for each member set.

18. The controller of claim 7 further comprising:

a reel-type, tape instrument means attached at a first end to said support and at a second end to a tooth edge of said small bucket member to indicate a digging angle and distance of said large member with respect to said large deck.

\* \* \* \* \*

UNITED STATES PATENT AND TRADEMARK OFFICE
CERTIFICATE OF CORRECTION

PATENT NO. : 5,497,568                         Page 1 of 2
DATED : March 12, 1996
INVENTOR(S) : William A. Strickland It is certified that error appears in the above-indentified patent and that said Letters Patent is hereby corrected as shown below:

On the title page, item [57], Abstract, line 5, "bracket" should be --bucket--.

| Column | Line | | |
|---|---|---|---|
| 1 | 56 | "duping" | --during-- |
| 4 | 7 | "boob" | --boom-- |
| 7 | 39 | "Notion" | --Motion-- |
| 7 | 66 | ") controller" | --controller-- |
| 10 | 39 | "mope" | --more-- |
| 10 | 43 | "duping" | --during-- |
| 15 | 63 | "size, cylinder" | --size as cylinder--. |
| 16 | 34 | "each" | --each motion--. |
| 19 | 33 | "boon" | --boom-- |
| 20 | 28 | "Notion" | --Motion-- |

UNITED STATES PATENT AND TRADEMARK OFFICE
CERTIFICATE OF CORRECTION

PATENT NO. : 5,497,568
DATED : March 12, 1996
INVENTOR(S) : William A. Strickland Page 2 of 2

It is certified that error appears in the above-indentified patent and that said Letters Patent is hereby corrected as shown below:

| 26 | 51 | "Master" | --small-- |
| 4  | 8  | " , "    | --.--.    |

Signed and Sealed this

Twenty-first Day of January, 1997

Attest:

BRUCE LEHMAN

*Attesting Officer*  *Commissioner of Patents and Trademarks*